(12) United States Patent
Streeter et al.

(10) Patent No.: US 10,801,790 B2
(45) Date of Patent: *Oct. 13, 2020

(54) PLATE FIN HEAT EXCHANGER FLEXIBLE MANIFOLD STRUCTURE

(71) Applicant: Hamilton Sundstrand Corporation, Charlotte, NC (US)

(72) Inventors: James Streeter, Torrington, CT (US); Feng Feng, South Windsor, CT (US); Matthew W. Miller, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/193,723

(22) Filed: Nov. 16, 2018

(65) Prior Publication Data

US 2019/0285364 A1 Sep. 19, 2019

Related U.S. Application Data

(63) Continuation-in-part of application No. 15/923,561, filed on Mar. 16, 2018, now Pat. No. 10,443,959, and
(Continued)

(51) Int. Cl.
*F28F 9/02* (2006.01)
*B33Y 10/00* (2015.01)
(Continued)

(52) U.S. Cl.
CPC ............ *F28F 9/0204* (2013.01); *B33Y 10/00* (2014.12); *B33Y 80/00* (2014.12); *F28F 19/00* (2013.01);
(Continued)

(58) Field of Classification Search
CPC .... F28F 9/0204; F28F 19/00; F28F 2009/029; F28F 2009/0297; F28F 2255/02; F28F 2265/26; B33Y 10/00; B33Y 80/00
(Continued)

(56) References Cited

U.S. PATENT DOCUMENTS 3,526,274 A * 9/1970 Gardner ................ F28D 7/0041
165/145
4,336,642 A 6/1982 Engelberts
(Continued)

FOREIGN PATENT DOCUMENTS

DE 19644711 A1 4/1998
EP 2565321 A1 3/2013
(Continued)

OTHER PUBLICATIONS

Extended European Search Report dated Mar. 13, 2020, received for corresponding European Application No. 19208360.8, 10 pages.
(Continued)

*Primary Examiner* — Davis D Hwu
(74) *Attorney, Agent, or Firm* — Kinney & Lange, P.A.

(57) ABSTRACT

A flexible manifold adapted for use on a plate-fin heat exchanger core, the flexible manifold comprising a plurality of individual layers, each individual layer defining a lower floor, an upper floor, and two side walls. Each of the plurality of individual layers is adapted to channel a flow of a medium therethrough, each of the plurality of individual layers includes a plurality of vertical members, each of the plurality of vertical members extends vertically from the lower floor to the upper floor of the respective individual layer, and each of the plurality of vertical members is configured to provide structural support for the respective individual layer. The
(Continued)

vertical members can be vertical guide vanes and/or vertical columns having a round and/or hydrofoil cross-sectional shape.

18 Claims, 8 Drawing Sheets

Related U.S. Application Data a continuation-in-part of application No. 16/151,988, filed on Oct. 4, 2018.

(51) Int. Cl.
*B33Y 80/00* (2015.01)
*F28F 19/00* (2006.01)

(52) U.S. Cl.
CPC . *F28F 2009/029* (2013.01); *F28F 2009/0297* (2013.01); *F28F 2255/02* (2013.01); *F28F 2265/26* (2013.01)

(58) Field of Classification Search
USPC ........................................................ 165/174
See application file for complete search history.

(56) References Cited

U.S. PATENT DOCUMENTS

| | | | |
|---|---|---|---|
| 5,629,476 A * | 5/1997 | Sondey | G01M 15/02 248/219.3 |
| 8,726,976 B2 | 5/2014 | Schrader et al. | |
| 9,618,278 B2 | 4/2017 | Denkenberger | |
| 2004/0261379 A1 | 12/2004 | Bruun et al. | |
| 2013/0232991 A1 | 9/2013 | Otero | |
| 2016/0202003 A1 | 7/2016 | Gerstler et al. | |
| 2017/0146305 A1 | 5/2017 | Kuczek et al. | |
| 2017/0211888 A1 | 7/2017 | Schwalm | |
| 2017/0363361 A1 | 12/2017 | Turney | |
| 2018/0283794 A1 * | 10/2018 | Cerny | B33Y 10/00 |
| 2019/0285349 A1 * | 9/2019 | Streeter | F28D 7/1684 |

FOREIGN PATENT DOCUMENTS

| | | |
|---|---|---|
| EP | 2980306 A1 | 2/2016 |
| EP | 3514469 A1 | 7/2019 |
| EP | 3540358 A1 | 9/2019 |
| FR | 3016027 A1 | 7/2015 |

OTHER PUBLICATIONS

European Office Action dated Apr. 21, 2020, received for corresponding European Application No. 19163199.3, 4 pages.
Extended European Search Report dated Mar. 5, 2020, received for corresponding European Application No. 19199541.4, 6 pages.
Extended European Search Report dated Jun. 25, 2020, received for corresponding European Application No. 19208360.8, 10 pages.

* cited by examiner

US 10,801,790 B2

PLATE FIN HEAT EXCHANGER FLEXIBLE MANIFOLD STRUCTURE

CROSS-REFERENCE TO RELATED APPLICATION

This application is a continuation in part of U.S. patent application Ser. No. 15/923,561, entitled "INTEGRAL HEAT EXCHANGER MANIFOLD GUIDE VANES AND SUPPORTS", filed Mar. 16, 2018, and is also a continuation in part of U.S. patent application Ser. No. 16/151,988, entitled "PLATE FIN HEAT EXCHANGER FLEXIBLE MANIFOLD", filed Oct. 4, 2018, both of which are hereby incorporated by reference in their entirety.

BACKGROUND

The present disclosure relates to heat exchangers, and more particularly, to a plate-fin heat exchanger manifold design that improves the thermal robustness of the plate-fin heat exchanger.

Plate-fin heat exchangers are well known in the aviation arts and in other industries for providing a compact, low-weight, and highly-effective means of exchanging heat from a hot fluid to a cold fluid. Heat exchangers that operate at elevated temperatures, such as those in modern aircraft engines, often have short service lives due to high steady state and cyclic thermal stresses. Inlet and exit manifolds are typically pressure vessels that are welded or bolted at only the exterior perimeter to a heat exchanger core or matrix. Pressure requirements dictate the thickness of these manifolds, usually resulting in a relatively thick header attached to a thin core matrix. This mismatch in thickness and mass, while acceptable for pressure loads, conflicts with the goal of avoiding geometric, stiffness, mass, and material discontinuities to limit thermal stress.

SUMMARY

A flexible manifold adapted for use on a plate-fin heat exchanger core, the flexible manifold includes a plurality of individual layers, each individual layer defining a lower floor, an upper floor, and two side walls. Each of the plurality of individual layers is adapted to channel a flow of a medium therethrough, each of the plurality of individual layers includes a plurality of vertical members, each of the plurality of vertical members extends vertically from the lower floor to the upper floor of the respective individual layer, and each of the plurality of vertical members is configured to provide structural support for the respective individual layer.

A method of additively manufacturing a first flexible manifold for a heat exchanger, comprising the steps of additively building a housing for the first flexible manifold, additively building a plurality of horizontal guide vanes defining a plurality of individual layers for a medium within the housing, and additively building a plurality of vertical members within each of the plurality of individual layers. Each of the plurality of individual layers is adapted to channel a flow of the medium therethrough, each of the plurality of vertical members extends vertically from the lower floor to the upper floor of the respective individual layer, and each of the plurality of vertical members is configured to provide structural support for the respective individual layer.

DETAILED DESCRIPTION

Figure 1A:
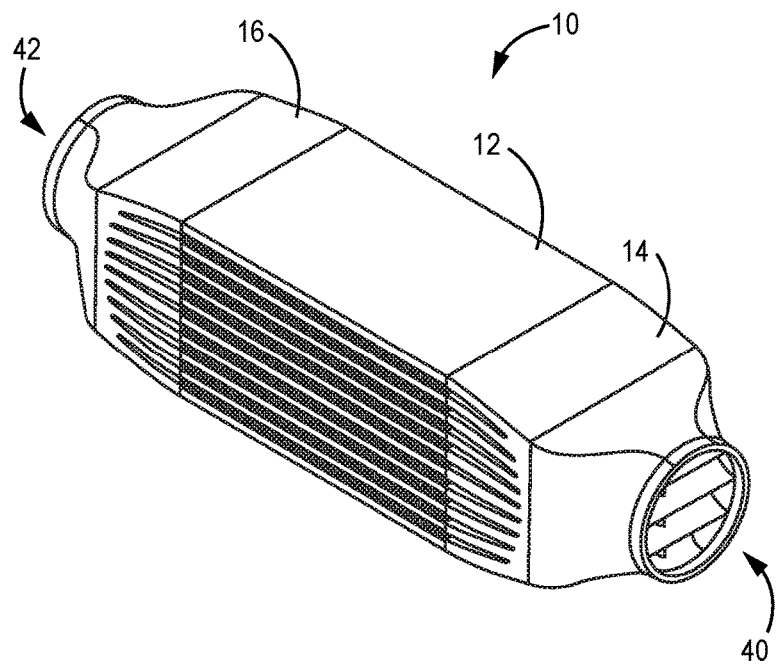
FIG. 1A is a perspective view of a plate-fin heat exchanger core with a hot layer inlet and outlet flexible manifolds.

FIG. 1A is a perspective view of a plate-fin heat exchanger core showing the hot layer inlet and outlet manifolds. Shown in FIG. 1A are heat exchanger 10, heat exchanger core 12, first hot manifold 14, second hot manifold 16, hot inlet 40, and hot outlet 42. Heat exchanger 10 includes heat exchanger core 12, where heat can be transferred from a hot medium (not shown) to a cold medium (not shown), while separating the hot medium from the cold medium. Accordingly, heat exchanger 10 includes a hot circuit (not shown) and a cold circuit (not shown). The hot and cold mediums can be a fluid, either or both being a liquid, gas, and/or a mixture of liquid and gas. The hot and/or cold mediums can change phase in or near heat exchanger 10. The hot and/or cold mediums can entrain particles. As used in this disclosure, the hot and/or cold mediums can be referred to as fluids.

The hot medium can be called a first medium, and the cold medium can be called a second medium. Accordingly, the hot circuit can be called a first circuit, and the cold circuit can be called a second circuit. The hot medium enters first hot manifold 14 at hot inlet 40, flows through heat exchanger core 12, and exits through second hot manifold 16 at hot outlet 42. Heat exchanger 10 can also include a first and second cold manifold (not shown) for directing the cold circuit. Heat exchanger 10 depicted in FIG. 1A is a cross-flow heat exchanger, because flow through the hot flow circuit is generally across flow through the cold flow circuit (i.e., the direction of hot flow through the heat exchanger core is generally perpendicular to the direction of cold flow through the heat exchanger core). The flow configuration can be different in other embodiments. Moreover, in other embodiments, more than one hot inlet 40 and/or hot outlet 42 can exist.

Figure 1B:
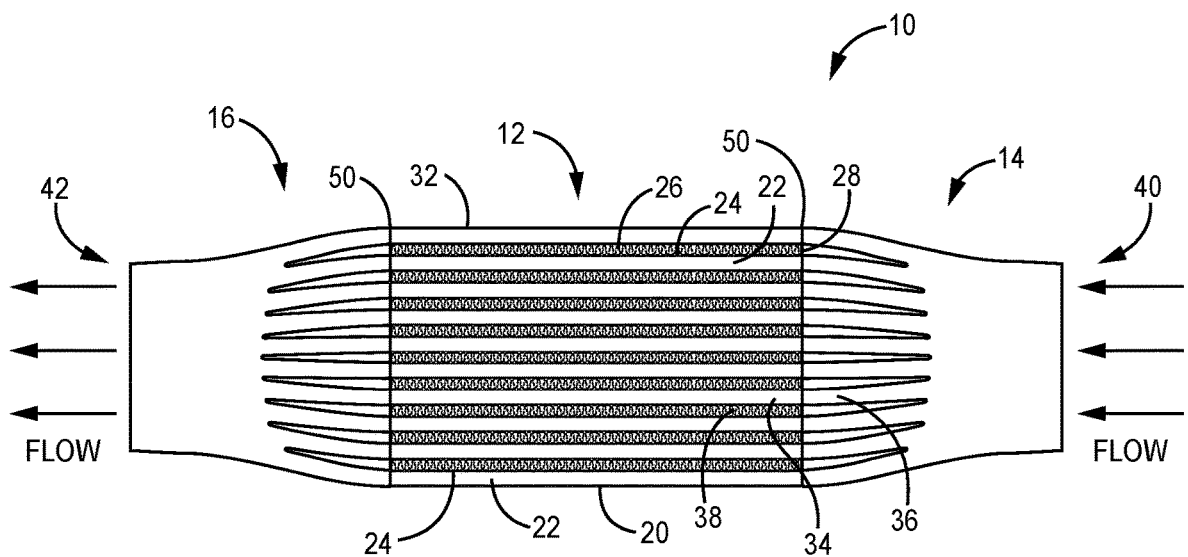
FIG. 1B is a side view of the plate-fin heat exchanger core with the hot layer inlet and outlet flexible manifolds shown in FIG. 1A.

FIG. 1B is a side view of the plate-fin heat exchanger core of FIG. 1A. Shown is FIG. 1B are heat exchanger 10, heat exchanger core 12, first hot manifold 14, second hot manifold 16, bottom end sheet 20, hot closure bars 22, parting sheets 24, cold fins 26, cold closure bars 28, top end sheet 32, hot layers 34, individual layers 36, cold layers 38, hot inlet 40, hot outlet 42, and metallurgical bonds 50. As described above with respect to FIG. 1A, the hot medium (not shown) enters first hot manifold 14 at hot inlet 40. The hot medium is directed via individual layers 36 into heat exchanger core hot layers 34, then recombines in second hot manifold 16 and exits via hot outlet 42. Alternating hot layers 34 and cold layers 38 are sandwiched between bottom end sheet 20 and top end sheet 32. Hot fins (not shown) channel the flow of the hot medium with boundaries defined by hot closure bars 22 on either side of each hot layer, and parting sheets 24 on the top and bottom of each layer. Similarly, cold fins 26 channel the flow of the cold medium with boundaries defined by cold closure bars 28 on either side of each cold layer, and parting sheets 24 on the top and bottom of each layer. Metallurgical bonds 50 join each individual layer 36 to the respective hot closure bars 22 and parting sheets 24 of heat exchanger core 12 at hot inlet 40 and hot outlet 42. Each hot layer 34 includes hot fin 30 (not shown), hot closure bars 22 on the left and right, and parting sheets 24 on the top and bottom. Similarly, each cold layer 38 includes cold fins 26, cold closure bars 28 on the left and right, and parting sheets 24 on the top and bottom. Generally, a particular parting sheet 24 is shared by an adjacent hot layer 34 and cold layer 38. Each individual layer 36 includes side walls (not shown in FIG. 1B) and individual layer floors (not shown in FIG. 1B), with the side walls being the outer vertical portions of individual layer 36 and the individual layer floors being the upper and lower horizontal portions of individual layers 36. Therefore, metallurgical bonds 50 exist between the side walls and closure bars 22, and between the individual layer floors and parting sheets 24 on first hot manifold 14 and on the second hot manifold. Metallurgical bonds 50 can be created by one of several metal bonding processes, with non-limiting examples including brazing and welding. In the illustrated embodiment, ten hot layers and nine cold layers are used. In other embodiments, there can be practically any number of hot layers and/or cold layers. First and second hot manifolds 14, 16 can be called flexible manifolds because they are thermally and mechanically compliant, thereby being able to withstand temperature and/or pressure changes and/or transients during all phases of operation of heat exchanger 10.

Figure 2:
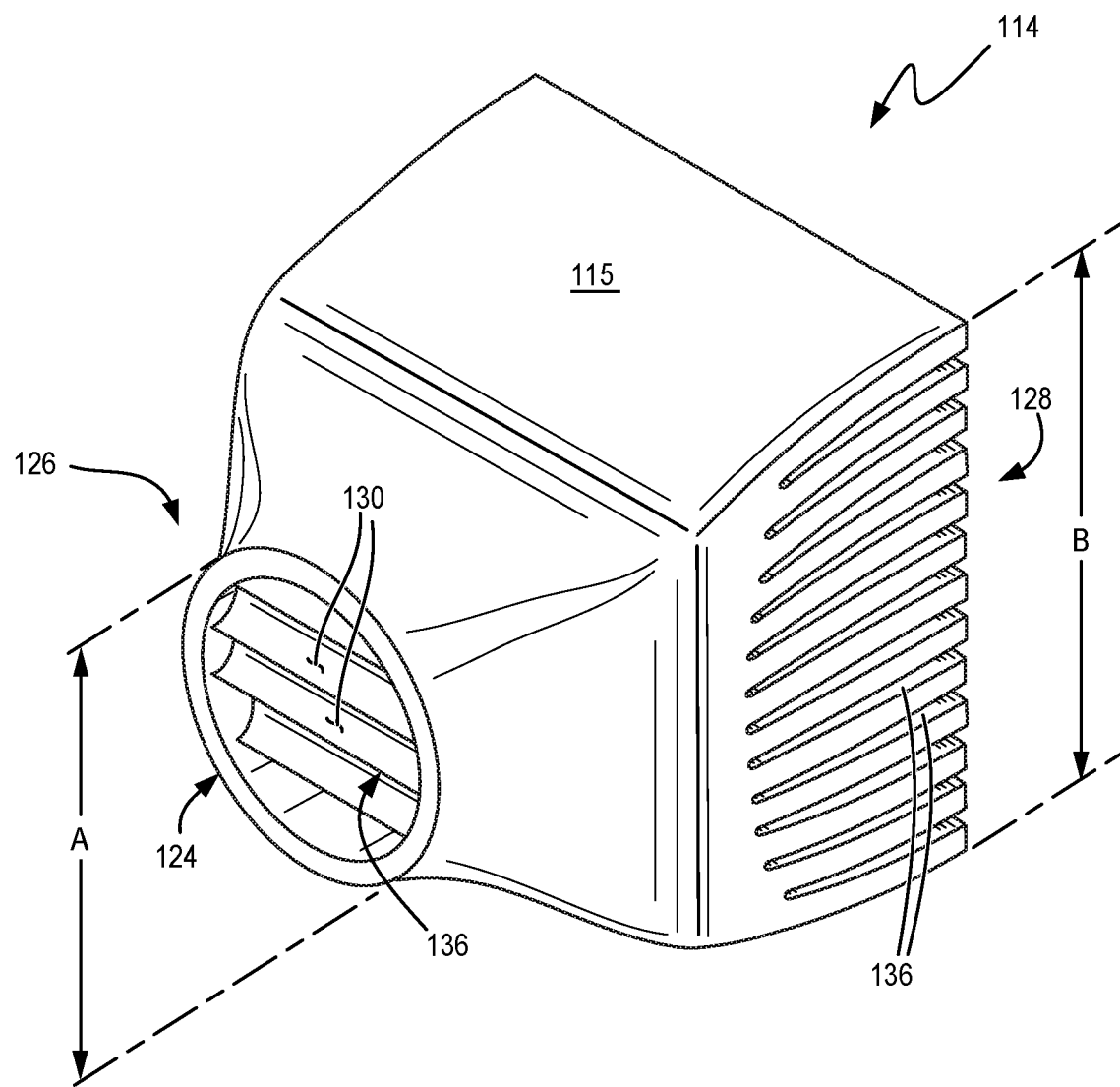
FIG. 2 is a perspective view of a second embodiment of a flexible manifold.
Figure 3A:
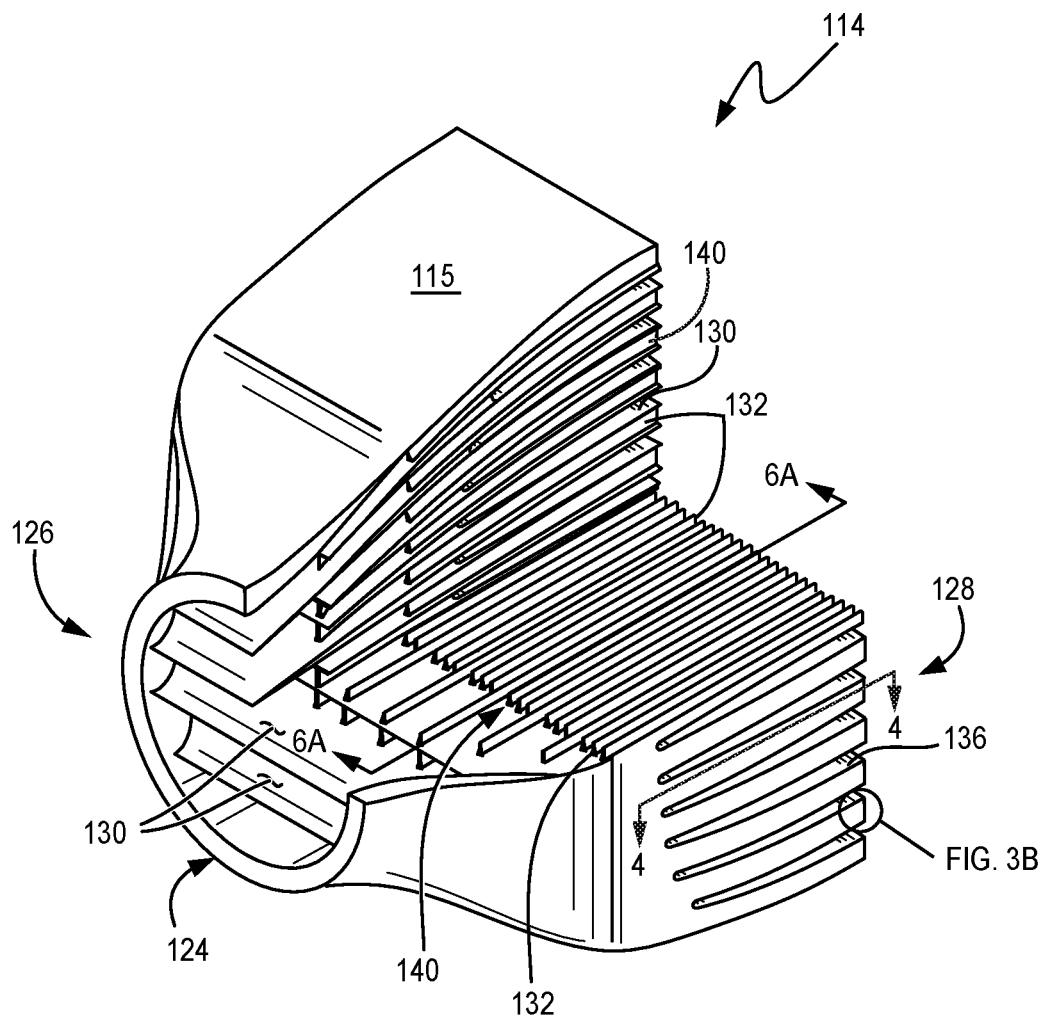
FIG. 3A is a quarter cut-away perspective view of the flexible manifold shown in FIG. 2.
Figure 3B:
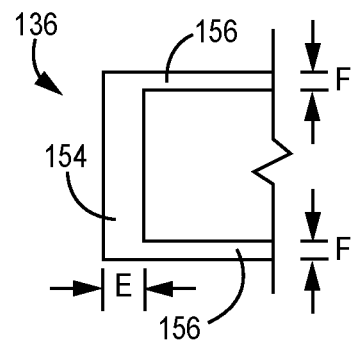
FIG. 3B is an end view of a portion of an individual layer of the flexible manifold shown in FIG. 3A.

FIG. 2 is a perspective view of a second embodiment of the flexible manifold. FIG. 3A is a quarter cut-away perspective view of the flexible manifold of FIG. 2. FIG. 3B is an end view of a portion of an individual layer of the flexible manifold shown in FIG. 3A. Shown in FIGS. 2 and 3A-3B are flexible manifold 114, housing 115, port 124, first end 126, second end 128, horizontal guide vanes 130, vertical guide vanes 132, individual layers 136, discrete manifold flow passages 140, side wall second end region 154, and floor second end region 156. Accordingly, as used herein, floor second end region 156 refers to both the lower and upper horizontal sections of each individual layer 136, and can also be referred to as "floor". Moreover, as used herein, the terms "vertical" and "horizontal" are relative to a standard upright orientation of the heat exchanger, and they do not necessarily imply these guide vanes have specific orientations relative to gravity or the placement and/or orientation of the heat exchanger. Moreover, these terms do not necessarily require, unless specifically stated, that the vanes are exactly perpendicular to one another at some or all points. Accordingly, horizontal guide vanes 130 can be called first guide vanes, and vertical guide vanes 132 can be called second guide vanes.

A plurality of horizontal guide vanes 130 extending at least part of a distance from the first end 126 to the second end 128 of flexible manifold 114, or vice versa, define individual layers 136 for at least one medium (e.g., the hot medium in FIGS. 1A-1B). Together with horizontal guide vanes 130, a plurality of vertical guide vanes 132, formed at a nonzero angle to horizontal guide vanes 130, can divide ones of the individual layers 136 into a plurality of first discrete manifold flow passages 140 extending at least part of a distance from the first end 126 to the second end 128 of flexible manifold 114, or vice versa. In some embodiments, vertical guide vanes 132 can make an angle that is near 90 deg. to horizontal guide vanes 130. Direction of flow would depend on whether flexible manifold 114 is serving as an inlet manifold or an outlet manifold.

Individual layers 136 of flexible manifold 114 can be formed as gradual transitions (i.e., continuous, homogeneous transitions) from first end 126 to second end 128 to reduce or eliminate discontinuities that otherwise in conventional designs can cause high stress to the heat exchanger core (not shown), which can lead to an abbreviated service life. Rather, in the present design, the plurality of horizontal vanes 130 and thus individual layers 136 are cantilevered and flexible to allow for elastic deformation from media flowing through the manifold passages. As shown, first end 126 can include an opening or port 124 of size A (sized for coupling to a duct, pipe, or the like to receive the first medium 120) that is smaller than a size B of second end 128 at a manifold/core interface (e.g., heat exchanger core 12 in FIGS. 1A-1B). Size A can be a diameter of port 124. Size B can be a height of an opening at second end 128. Size B can also correspond to the cumulative area of the opening at second end 128. Depicted in FIG. 3B is a portion of individual layer 136 as viewed from second end 128 showing side wall second end region 154 and floor second end region 156. With reference to individual layers 136, side wall second end region 154 can be referred to as the sidewalls, and floor second end regions 156 can be referred to as the floors. In the illustrated embodiment, "floor" refers to both the upper and lower floor second end regions 156 of individual layer 136. Side wall second end region 154 has thickness E, and floor second end region 156 has thickness F, as shown in FIG. 3B. Each individual layer 136 includes side walls 154 and individual layer floors 156, with side walls 154 being the outer vertical portions of individual layer 136 and individual layer floors 156 being the upper and lower horizontal portions of individual layers 136. Accordingly, as used herein, "floor" refers to both the lower and upper horizontal sections of each individual layer 136. For descriptive purposes, each individual layer 136 can be said to have a lower floor and an upper floor.

Flexible manifold 114 can be formed by additive manufacturing, hybrid additive subtractive manufacturing, subtractive manufacturing, and/or casting, for example. Embodiments of flexible manifolds 114 described herein can leverage additive manufacturing or any other manufacturing method or methods (e.g., casting) that allows one to construct continuous, homogeneous transitions between the heat exchanger core 12 (not shown) and one or more flexible manifolds 114. Additive manufacturing is also useful in building and tailoring vertical guide vanes 132 within flexible manifolds 114. As horizontal guide vanes 130 reduce discontinuities in material properties and thermal expansion between flexible manifold 114 and heat exchanger core 12, vertical guide vanes 132 provide stiffness and support to withstand the pressure of medium(s) flowing through flexible manifold 114 (where welds or bolted flanges are required in conventional heat exchangers). Accordingly, a method of the present disclosure includes forming heat exchanger core 12 for heat exchanger 10 and additively manufacturing a first flexible manifold 114 for heat exchanger 10. Forming a first flexible manifold 114 includes additively building housing 115 for first flexible manifold 114. Within housing 115, a plurality of horizontal guide vanes 130 are additively built, defining individual layers 136 for the first medium. A plurality of vertical guide vanes 132 can also be additively built, dividing ones of individual layers 136 into a plurality of discrete manifold flow passages 140.

In an exemplary embodiment, laser powder bed fusion can be used as an additive manufacturing process to fabricate flexible manifold 114 from metallic materials. Non-limiting examples of metallic materials that can be used include nickel, aluminum, titanium, copper, iron, cobalt, and all alloys that include these various metals. In some embodiments, various alloys of INCONEL™ can be used to fabricate flexible manifold 114, with Inconel 625 and Inconel 718 being two exemplary alloy formulations. In other embodiments, HAYNES™ 282 can be used in fabricating flexible manifold 114. In yet other embodiments, alloys of aluminum can be used in fabricating to flexible manifold 114. For example, an alloy of aluminum known as AlSi10Mg can be used in fabricating flexible manifold 114. All materials that include metals, metal oxides, and alloys thereof in fabricating flexible manifold 114 are within the scope of the present disclosure.

Vertical guide vanes 132 extend the interior vertical dimension of any particular individual layer 136, contacting both the lower and upper horizontal sections of each individual layer 136 (i.e., both floor second end region 156, or both the "lower floor" and the "upper floor"). In the illustrated embodiment, vertical guide vanes 132 are fabricated during the fabrication of individual layers 136 of flexible manifold 114, being a material that is homogeneous with individual layers 136. Accordingly, vertical guide vanes 132 help provide structural support for individual layers 136, with structural support being provided under both static and dynamic conditions. In a particular embodiment, flexible manifold 114 can be used in an application where the medium has a pressure as high as 1,000 psi (6,895 KPa). Accordingly, vertical guide vanes 132 can assist in limiting or preventing individual layers 136 from deforming under the working pressure of the medium, thereby enhancing the mechanical compliancy of flexible manifold 114. Accordingly, in some embodiments, vertical guide vanes 132 can be under tensile load (i.e., vertical tensile stress in the orientation depicted in FIG. 3A). Therefore, in some embodiments, vertical guide vanes 132 provide internal structural support to individual layers 136 while also guiding the flow of a fluid (i.e., medium) through individual layers 136. Vertical guide vanes 132 can also be called vertical members because vertical guide vanes 132 are oriented vertically (with reference to the orientation illustrated in FIG. 3A).

Figure 4:
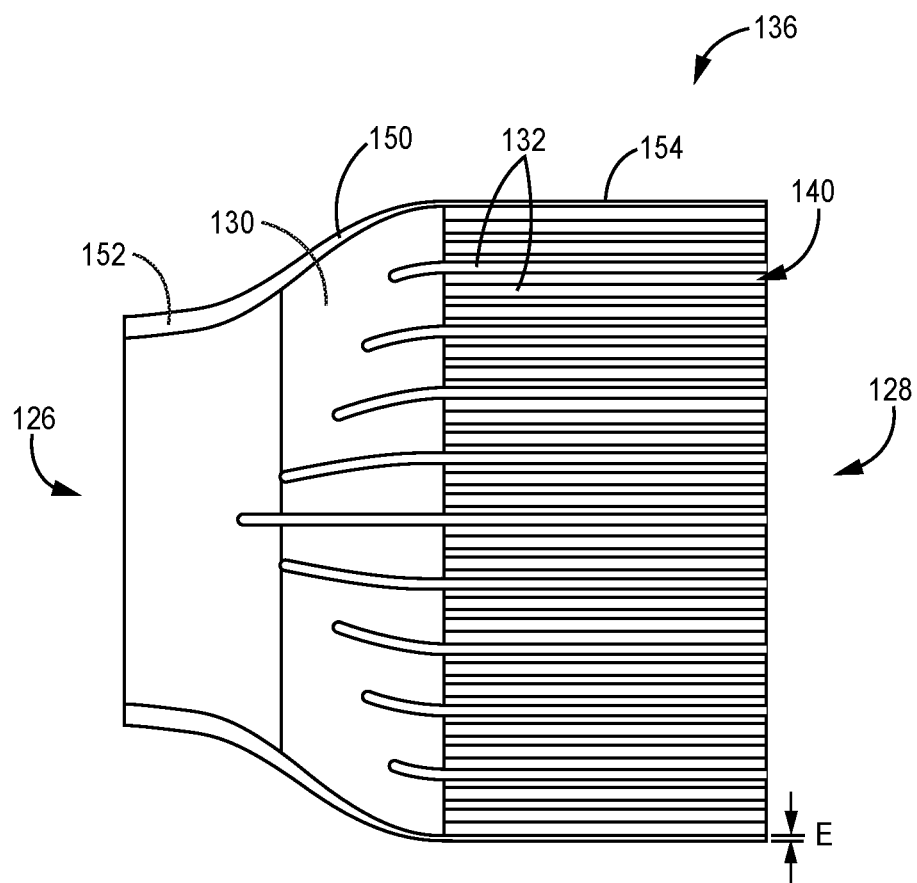
FIG. 4 is a top cross-sectional view of a layer of the flexible manifold shown in FIG. 2.

FIG. 4 is a top cross-sectional view taken at cut-line 4-4 of layer 136 of flexible manifold 114 shown in FIG. 3. Shown in FIG. 4 are first end 126, second end 128, horizontal guide vane 130, vertical guide vanes 132, individual layer 136, discrete manifold flow passage 140, side wall 150, side wall first end region 152, and side wall second end region 154. The medium flowing through individual layer 136 is contained by horizontal guide vanes 130 which form the top and bottom pressure boundaries of individual layer 136, and by side walls 150 which form the side pressure boundaries of individual layer 136. Vertical guide vanes 132 direct the flow through individual layer 136, thereby forming discrete manifold flow passages 140. Each side wall 150 has side wall first end region 152 and side wall second end region 154. The thickness of side wall 150 generally tapers from a greater thickness at side wall first end region 152 (corresponding to first end 126) to a smaller thickness at side wall second end region 154 (corresponding to second end 128). In the vicinity of second end 128, side wall second end region 154 has second end side wall thickness E as shown in FIG. 4.

In the embodiment illustrated in FIG. 4, flexible manifold 114 can be an inlet manifold, whereby the flow of a medium can enter individual layer at first end 126 and exit at second end 128 where it can enter a heat exchanger core as described with regard to FIGS. 2-3. In some embodiments, flexible manifold 114 can be an outlet manifold, with medium flow occurring in the opposite direction as described.

Vertical guide vanes 132 shown in FIG. 3A are depicted as continuous vertical structures that extend at least part of a distance from the first end 126 to the second end 128 of flexible manifold 114. Vertical guide vanes 132 can be referred to as vertical members, and several different embodiments of the vertical members are within the scope of the present disclosure, as will be described later in FIGS. 5B-5D. Accordingly, for illustration clarity, simplified drawings can be used to illustrate the detail of these various embodiments.

Figure 5A:
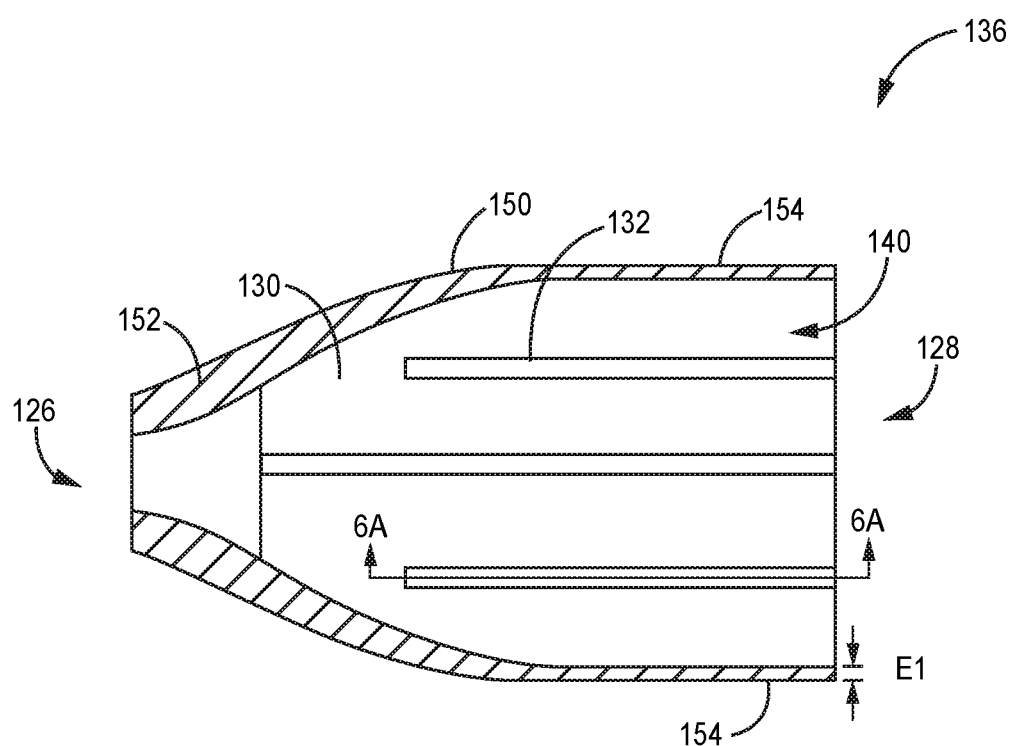
FIG. 5A is a top cross-sectional view of a layer of the flexible manifold shown in FIG. 2.

FIG. 5A is a simplified top cross-sectional view of individual layer 136 shown in FIG. 4. The numbering of features in FIG. 5A, and the description thereof, is the same as provided above with regard to FIG. 4. Second end side wall thickness E, shown in FIG. 4, is labeled as E1 in FIG. 5A. It is to be appreciated that the number of vertical guide vanes 132 shown in FIG. 5A is limited in order to illustrate the detail of vertical guide vanes 132. In various embodiments, practically any number of vertical guide vanes 132 can be included in each individual layer 136.

Figure 5B:
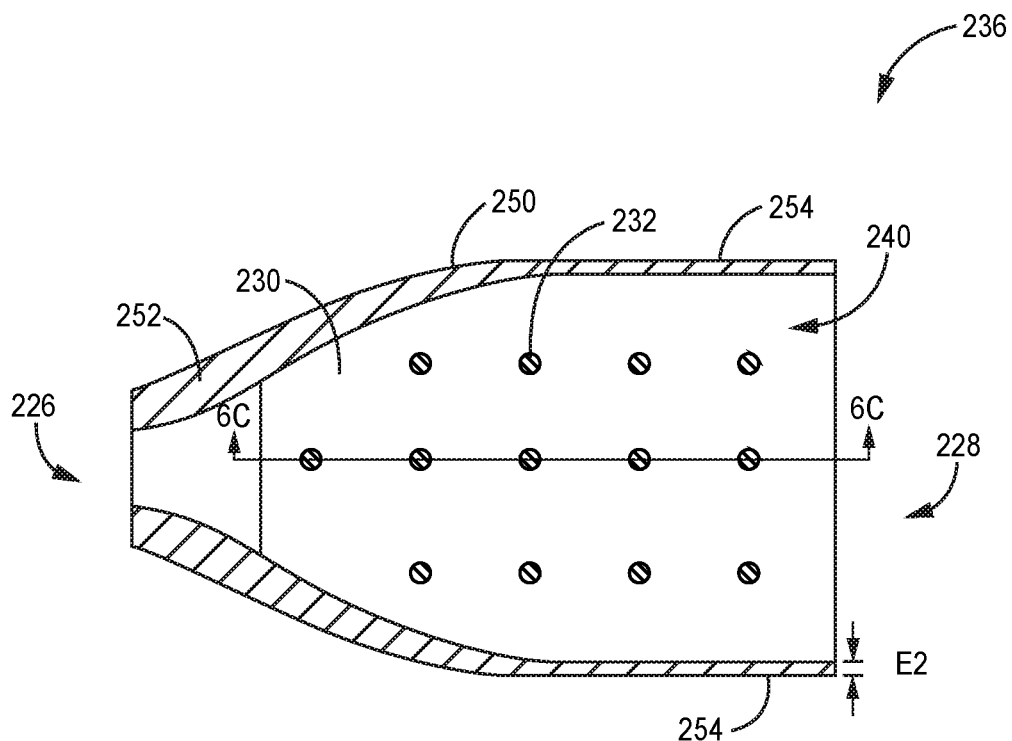
FIG. 5B is a top cross-sectional view of a second embodiment of a layer of the flexible manifold shown in FIG. 2.

FIG. 5B is a top cross-sectional view of a second embodiment of layer 136 of flexible manifold 114 shown in FIG. 3. The feature numbering in FIG. 5B is 100 higher than that in FIG. 5A. Shown in FIG. 5B are first end 226, second end 228, horizontal guide vane 230, vertical columns 232, individual layer 236, discrete manifold flow passage 240, side wall 250, side wall first end region 252, and side wall second end region 254. The medium flowing through individual layer 236 is contained by horizontal guide vanes 230 which form the top and bottom pressure boundaries of individual layer 236, and by side walls 250 which form the side pressure boundaries of individual layer 236. Vertical columns 232 can assist in directing and/or stabilizing the flow through individual layer 236, thereby forming discrete manifold flow passages 240. Unlike vertical guide vanes 132 shown in FIG. 5A, vertical columns 232 can allow some mixing of flow between discrete manifold flow passages 240. Each side wall 250 has side wall first end region 252 and side wall second end region 254. The thickness of side wall 250 generally tapers from a greater thickness at side wall first end region 252 (corresponding to first end 226) to a smaller thickness at side wall second end region 254 (corresponding to second end 228). In the vicinity of second end 228, side wall 250 has second end side wall thickness E2 as shown in FIG. 5B. As described above with regard to FIG. 5A, second end side wall thickness E2 can be specified to be similar to the thickness of hot closure bars 22. As will be described in greater detail in FIG. 6C, vertical columns 232 connect from the lower horizontal guide vane 230 to the upper guide vane 230 in each individual layer 236, thereby helping provide structural support for individual layers 236. In the illustrated embodiment, flow can occur in either direction from first end 226 to second end 228, or vice versa. Vertical columns 232 can also be referred to as vertical members.

Figure 5C:
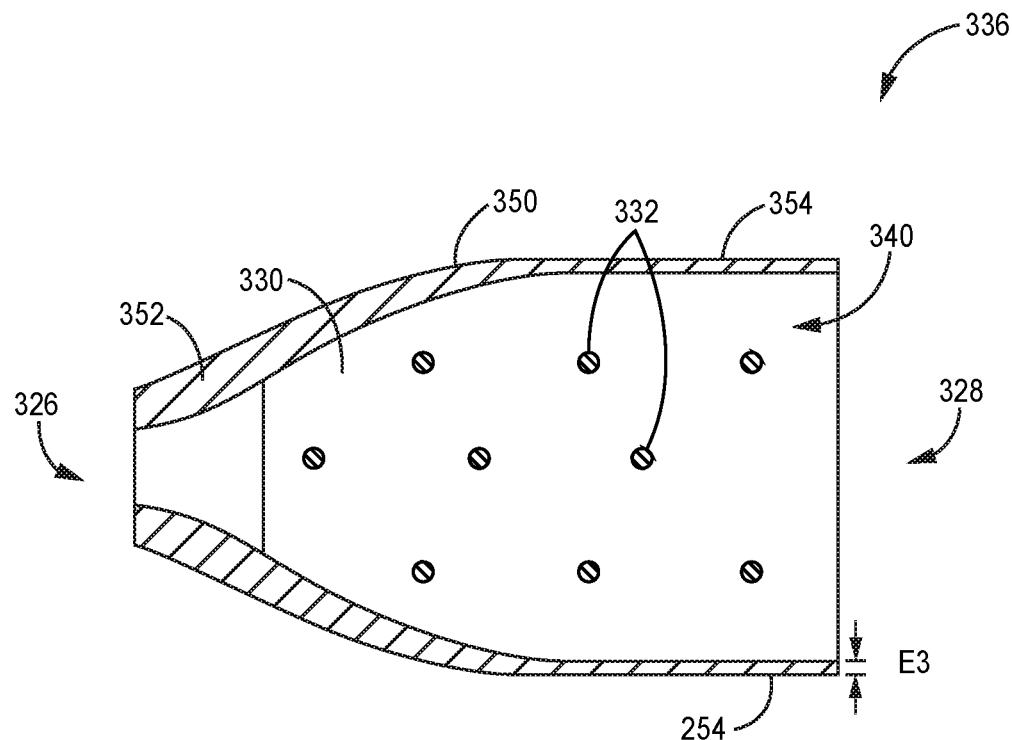
FIG. 5C is a top cross-sectional view of a third embodiment of a layer of the flexible manifold shown in FIG. 2.

FIG. 5C is a top cross-sectional view of a third embodiment of layer 136 of flexible manifold 114 shown in FIG. 3. The feature numbering in FIG. 5C is 200 higher than that in FIG. 5A. Shown in FIG. 5C are first end 326, second end 328, horizontal guide vane 330, vertical columns 332, individual layer 336, discrete manifold flow passage 340, side wall 350, side wall first end region 352, and side wall second end region 354. The description of individual layer 336 is substantially the same as that of individual layer 236 in regard to FIG. 5B. As described above with regard to FIG. 5A, second end side wall thickness E3 can be specified to be similar to the thickness of hot closure bars 22. In the illustrated embodiment, the arrangement of vertical columns 332 is in a different pattern from that shown in FIG. 5B. Accordingly, a greater degree of mixing can occur between discrete manifold flow passages 340 than could occur for the pattern shown in FIG. 5B. In the embodiment shown in FIG. 4C, flow can occur in either direction from first end 326 to second end 328, or vice versa.

The exemplary patterns of vertical columns 232, 332 shown in FIGS. 5B-5C are only two of a limitless number of possibilities that can exist in other embodiments. It is to be appreciated a number of vertical members that is much greater than that depicted in the simplified illustrations of FIGS. 5B-5C can be used to create other arrangement patterns of vertical members.

Figure 5D:
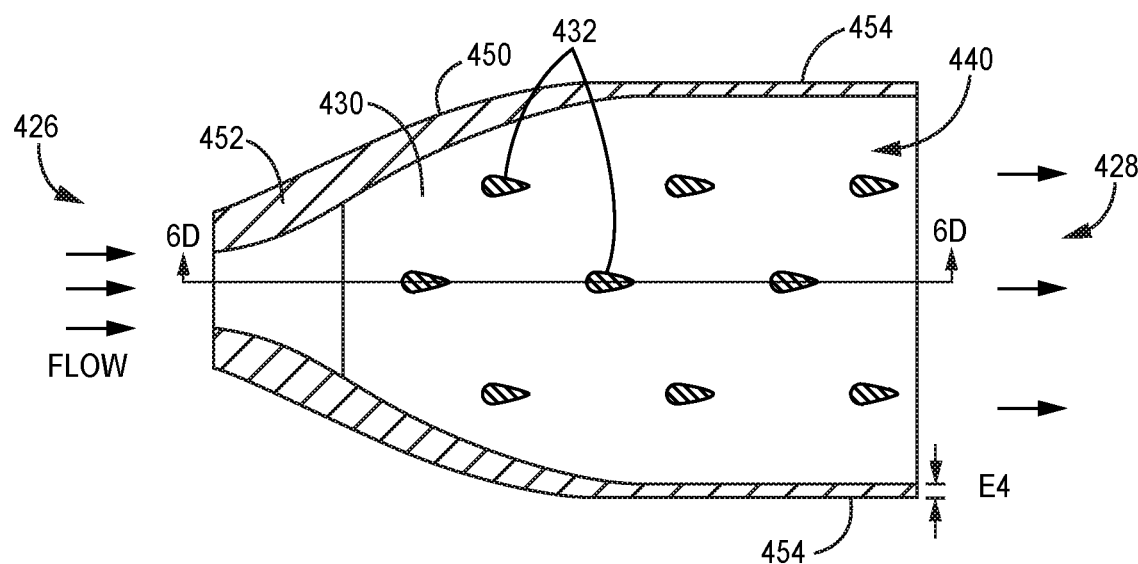
FIG. 5D is a top cross-sectional view of a fourth embodiment of a layer of the flexible manifold shown in FIG. 2.

FIG. 5D is a top cross-sectional view of a fourth embodiment of layer 136 of flexible manifold 114 shown in FIG. 3. The feature numbering in FIG. 5D is 300 higher than that in FIG. 5A Shown in FIG. 5D are first end 426, second end 428, horizontal guide vane 430, vertical hydrofoil columns 432, individual layer 436, discrete manifold flow passage 440, side wall 450, side wall first end region 452, and side wall second end region 454. The description of individual layer 436 is substantially the same as that of individual layer 236 in regard to FIG. 5B. As described above with regard to FIG. 5A, second end side wall thickness E4 can be specified to be similar to the thickness of hot closure bars 22.

In the illustrated embodiment, vertical hydrofoil columns 432 can further assist in directing and/or stabilizing the flow through individual layer 436 as compared to the embodiment shown in FIG. 4B. The cross-sectional shape of vertical hydrofoil columns 432 can reduce the resistance to flow of the medium passing through individual layer 436. In other terms, vertical hydrofoil columns 432 can be used to reduce the head loss of fluid flowing through individual layer 136 as compared to other designs. As used in this disclosure, "hydrofoil" refers to a structural shape that can present a reduced resistance to flow as compared to some other structural shapes, without implying that the flowing medium be water, or even a liquid. For example, in a particular embodiment, vertical hydrofoil columns 432 can be configured for the flow of air, or any other gas. Accordingly, the medium that flows around vertical hydrofoil columns 432 can be liquid, gaseous, or any mixture of liquid and/or gas. As used in this disclosure with regard to the fluid properties of vertical hydrofoil columns 432, "hydrofoil" and "airfoil" can be used interchangeably.

In other embodiments, the size and shape of vertical hydrofoil columns 432 can be selected to suit the particular embodiment of individual layer 436 with regard to a particular fluid (i.e., medium), with non-limiting examples of various fluid parameters that can be considered including the velocity, density, temperature, compressibility, and/or viscosity of the medium. Those who are skilled in the fluid dynamics art are familiar with hydrofoil and airfoil designs. In the embodiment illustrated in FIG. 5D, all vertical hydrofoil columns 432 are depicted as having approximately the same size, cross-sectional shape, and spacing from each other. In other embodiments, vertical hydrofoil columns 432 can have different sizes, cross-sectional shapes, and/or spacing from others throughout individual layer 436. Moreover, similar differences can exist from one individual later 436 to another throughout flexible manifold 114.

Referring again to FIG. 5D, each side wall 450 has side wall first end region 452 and side wall second end region 454. The thickness of side wall 450 generally tapers from a greater thickness at side wall first end region 452 (corresponding to first end 426) to a smaller thickness at side wall second end region 454 (corresponding to second end 428). In the vicinity of second end 428, side wall 450 has second end side wall thickness E4 as shown in FIG. 5D. In the illustrated embodiment, flow can generally occur in the direction from first end 426 to second end 428, as shown in FIG. 5D, because the hydrofoil shape of vertical hydrofoil columns 432 is generally optimized in the direction shown. However, in some other embodiments, flow can occur in the direction from second end 428 to first end 426. Vertical hydrofoil columns 432 can also be referred to as vertical members.

The size, cross-sectional shape, spacing, and arrangement pattern of vertical members depicted in FIGS. 5A-5D are exemplary, with differences to any of these parameters being within the scope of the present disclosure. For example, in some embodiments, vertical guide vanes 132 (shown in FIG. 5A) can be used with vertical columns 232, 332 (shown in FIGS. 5B-5C) and/or vertical hydrofoil columns 432 (shown in FIG. 5D). This can be referred to as the vertical member configuration. In other embodiments, the vertical member configuration can differ between various individual layers 136 in a particular flexible manifold 114. Additionally, in some embodiments, the vertical member configuration throughout individual layers 136 in a particular flexible manifold 114 can be different between flexible manifold being used as an inlet manifold and an outlet manifold, for example, if there are appreciable changes in the fluid properties of a medium as it flows from an inlet manifold to an outlet manifold.

Figure 6A:
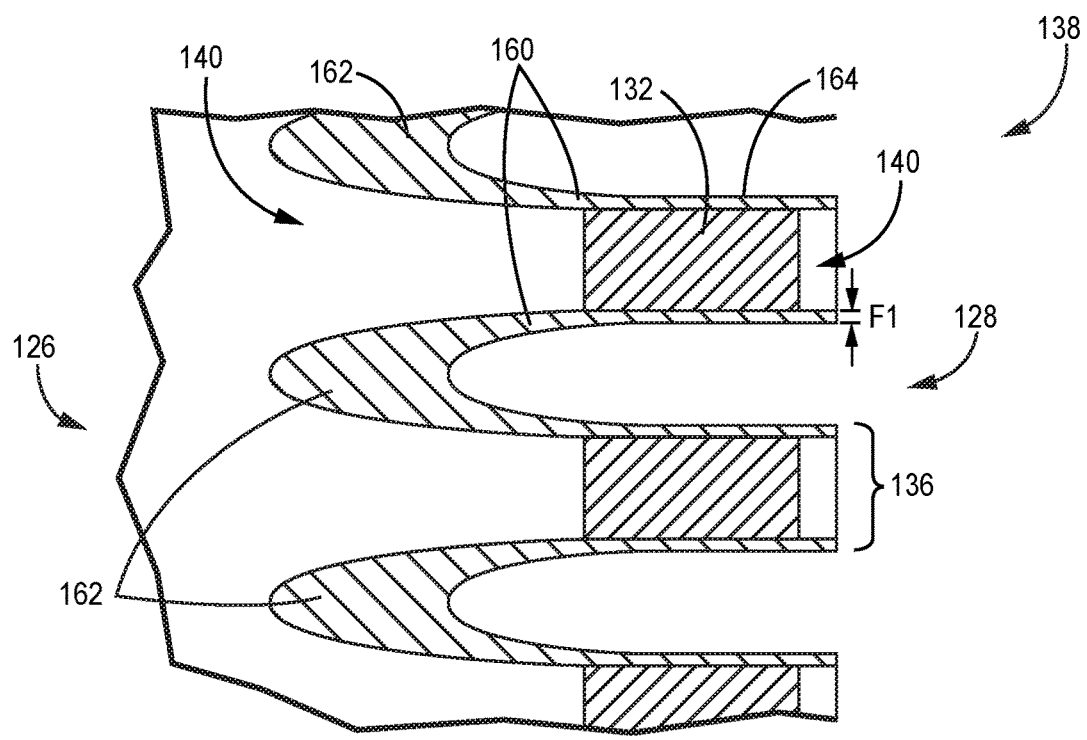
FIG. 6A is a side cross-sectional view showing several layers of the flexible manifold shown in FIG. 5A.

FIG. 6A is a side cross-sectional view taken at cut line 6A-6A in FIG. 5A showing several layers of the flexible manifold shown in FIG. 5A. Shown in FIG. 6A are first end 126, second end 128, individual layers group 138, vertical guide vanes 132, individual layers 136, discrete manifold flow passages 140, individual layer floors 160, thick regions 162, and thin regions 164. The description of individual layers 136 are substantially the same as provided above with regard to FIG. 5A. In the embodiment shown in FIG. 6A, horizontal guide vanes 130 in FIG. 5A are shown as individual layer floors 160 to help show the horizontal pressure boundaries of individual layers 136. Individual layer floors 160 emerge from thick region 162 and taper in thickness near thin region 164 situated at second end 128. Individual layer floors 160 have floor thickness F1 at second end 128, as shown in FIG. 6A.

In an embodiment, floor thickness F1 can be specified to be similar to the thickness of parting sheet 24 as shown in FIG. 1B. In these embodiments, individual floor layers 160 are metallurgically joined to parting sheets 24, thereby partially joining flexible manifold 114 (shown in FIGS. 2 and 3A) to a heat exchanger core. Accordingly, by providing floor thickness F1 similar to the thickness of parting sheet 24, the mechanical and/or thermal flexibility of flexible manifold 114 can be enhanced. In other embodiments, floor thickness F1 can be greater than or less than the thickness of parting sheet 24.

Referring again to FIG. 6A, vertical guide vane 132 spans the interior height of each individual layer 136, from one individual floor layer 160 to the next. In the embodiment shown in FIG. 6A, vertical guide vanes 132 are rectangular in cross-sectional shape, having straight vertical edges at both the edge nearest second end 128 and away from second end 128. In other embodiments, vertical guide vanes 132 can have edges that are different from that depicted in FIG. 6A. For example, vertical edges having a geometry that is different from straight can be used for one or more reasons, as will be described later in FIG. 6B.

Figure 6B:
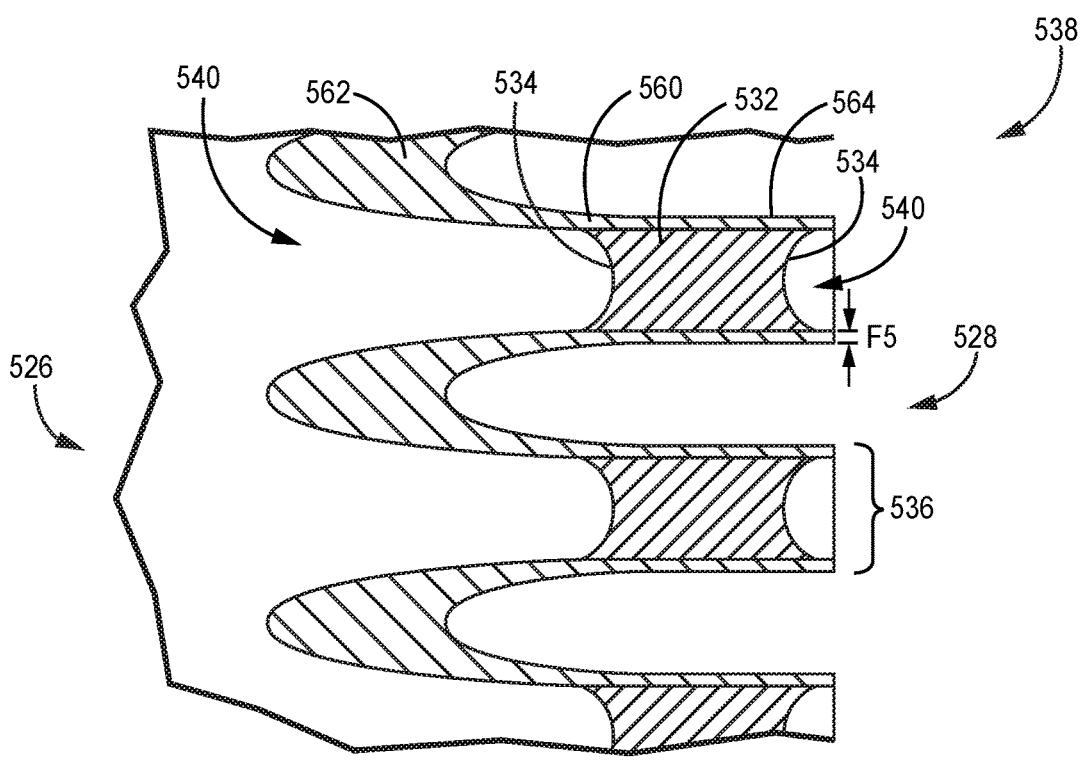
FIG. 6B is a side cross-sectional view showing several layers of a second embodiment of the flexible manifold shown in FIG. 5A.

FIG. 6B is a side cross-sectional view showing several layers of a second embodiment of the flexible manifold shown in FIG. 5B, taken at the same cut line as in FIG. 6A. Shown in FIG. 6B are first end 526, second end 528, individual layers group 538, vertical guide vanes 532, end radii 534, individual layers 536, discrete manifold flow passages 540, individual layer floors 560, thick regions 562, and thin regions 564. The description of individual layers 536 are substantially the same as provided above with regard to FIG. 6A. In the embodiment shown in FIG. 6B, vertical guide vanes 532 have end radius 534 at both the edge nearest second end 528 and away from second end 528. Several benefits can be achieved in the design of end radii 534 on vertical guide vanes 530, with non-limiting examples being to reduce material stress and/or structural vibration in flexible manifold 114, or to reduce flow turbulence of the fluid (i.e., medium) flowing through flexible manifold 114.

As described above with regard to FIG. 6A, vertical guide vanes 532 help maintain the structure of each individual layer 536, particularly when the medium within individual layers 536 is at pressure. Accordingly, in some embodiments, vertical guide vanes 532 can be under tensile stress in the vertical direction. Therefore, in these embodiments, end radii 534 help control stress intensification in the regions where vertical guide vanes 532 attach to individual floor layers 560. In other embodiments, end radii 534 can be shapes other than round as shown in FIG. 6B. As used in this disclosure with regard to the shape of vertical guide vanes 532, the term "radius" can be used to describe any curved geometrical shape. In some embodiments, non-limiting examples of geometric shapes for end radii 534 can be elliptical or parabolic. In other embodiments, one end of vertical guide vanes 532 can have a shape of end radius 534 different from the other end of vertical guide vanes 532. Referring again to FIG. 6B, individual floor layers 560 have floor thickness F5, with the value of floor thickness F5 being similar to that of floor thickness F1 described above with regard to FIG. 6A.

Figure 6C:
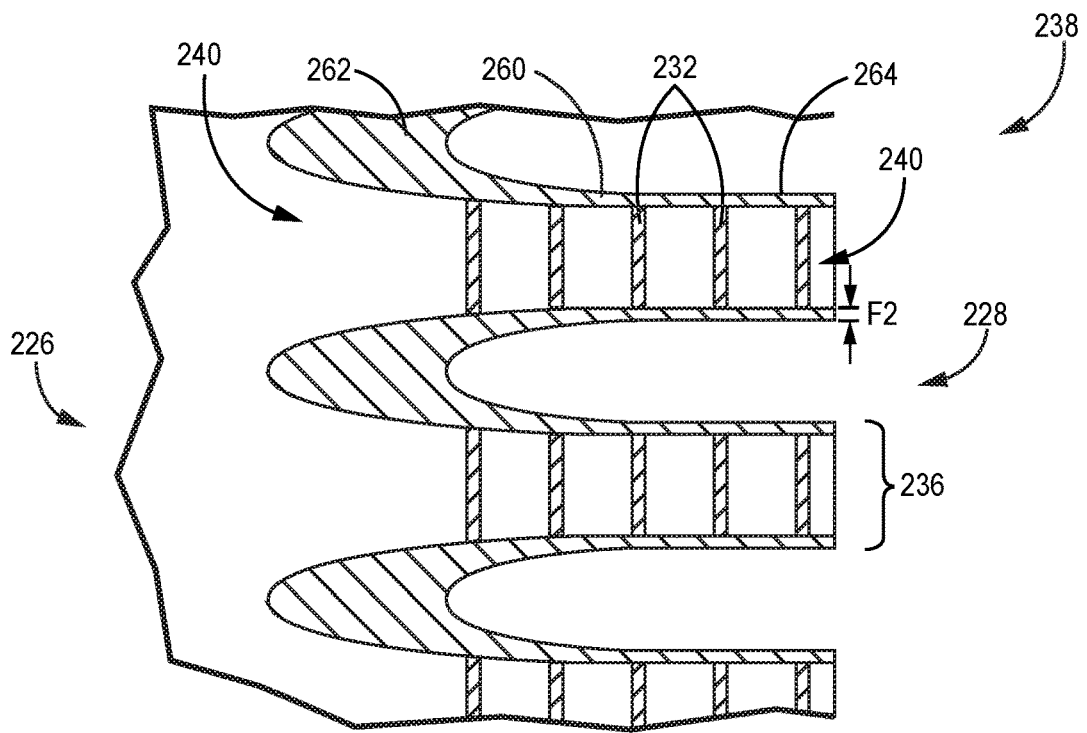
FIG. 6C is a side cross-sectional view showing several layers of the flexible manifold shown in FIG. 5B.

FIG. 6C is a side cross-sectional view taken at cut line 6C-6C in FIG. 5B showing several layers of the flexible manifold shown in FIG. 5B. Shown in FIG. 6C are first end 226, second end 228, individual layers group 238, vertical columns 232, individual layers 236, discrete manifold flow passages 240, individual layer floors 260, thick regions 262, and thin regions 264. The description of individual layers 236 are substantially the same as provided above with regard to FIG. 6B. In the embodiment shown in FIG. 6C, vertical columns 232 are shown as cross-sections of vertical columns 232 shown in FIG. 5B. Individual layer floors 260 have floor thickness F2 at second end 228, with the value of floor thickness F2 being similar to that of floor thickness F1 described above with regard to FIG. 6A.

Figure 6D:
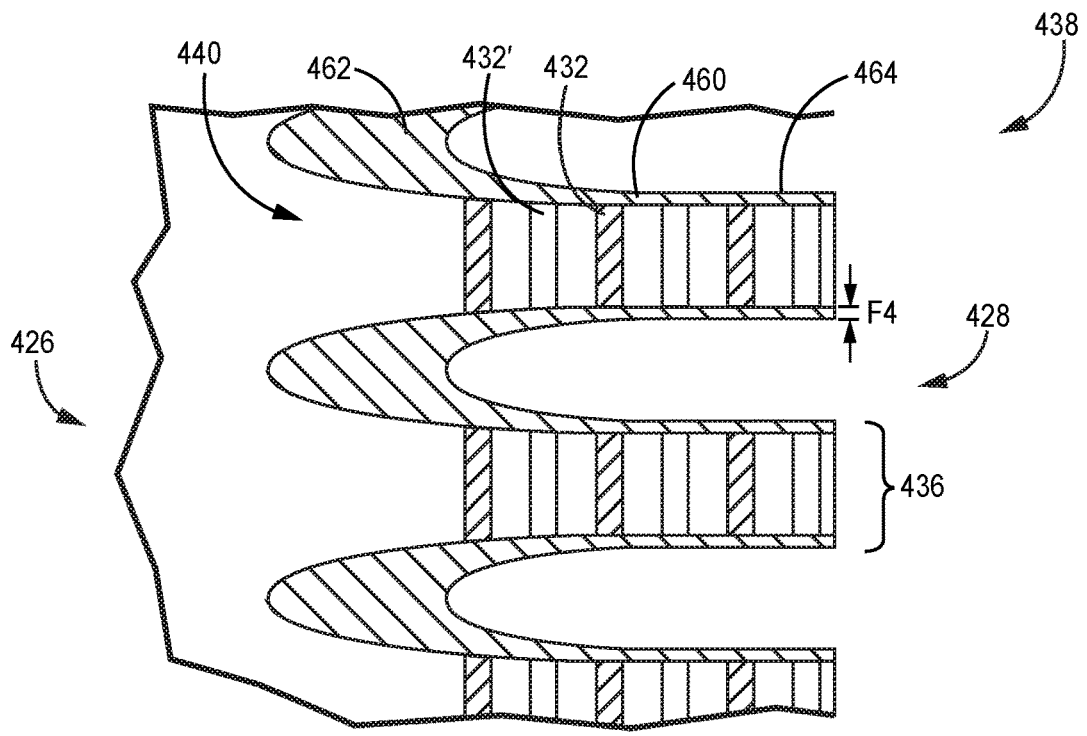
FIG. 6D is a side cross-sectional view showing several layers of the flexible manifold shown in FIG. 5D.

FIG. 6D is a side cross-sectional view taken at cut line 6D-6D in FIG. 5D showing several layers of the flexible manifold shown in FIG. 5D. Shown in FIG. 6D are first end 426, second end 428, individual layers group 438, vertical hydrofoil columns 432, 432', individual layers 436, discrete manifold flow passages 440, individual layer floors 460, thick regions 462, and thin regions 464. The description of individual layers 436 are substantially the same as provided above with regard to FIG. 5D. In the embodiment shown in FIG. 6D, vertical hydrofoil columns 432 are shown as cross-sections of vertical hydrofoil columns 432 shown in FIG. 5D. Non-cross-sectioned vertical hydrofoil columns 432' are also shown in FIG. 6D. Individual layer floors 460 have floor thickness F4 at second end 428, with the value of floor thickness F4 being similar to that of floor thickness F1 described above with regard to FIG. 6A.

As described above with regard to FIGS. 5A-5D and 6A-6D, several different combinations of vertical guide vanes 132, 532, vertical columns 232, and vertical hydrofoil columns 432 (i.e., vertical members) are possible on a particular flexible manifold 114 and are all within the scope of the present disclosure. Several factors can be considered in the particular design of the vertical members throughout a particular flexible manifold 114, with non-limiting examples being briefly described as follows. It can be advantageous to direct or control the flow of the medium through different regions of flexible manifold 114 to direct or control the flow of the medium through a heat exchanger core. Accordingly, the size, shape, and/or style of vertical members can vary throughout flexible manifold 114. It can be advantageous to have a different size, shape, and/or style of vertical members in flexible manifold 114 as used at hot inlet 40 as compared to hot outlet 42. The manufacturing process that is used to produce a particular flexible manifold 114 can introduce deviations in the mechanical tolerances, etc. throughout the vertical members. Accordingly, there can be measurable differences in the shape, size, and/or uniformity of the vertical members on a particular flexible manifold 114 that is manufactured in a production facility.

The exemplary description of flexible manifold 114 provided in the present disclosure was in regard to the hot circuit of heat exchanger 10, as shown in FIGS. 1A-1B. It is to be appreciated that heat exchanger 10 can also include a cold circuit in order to function properly in a particular embodiment. A cold fluid (i.e., medium) can flow through the cold circuit. Therefore, heat exchanger 10 can also include one or more cold inlet manifolds and/or cold outlet manifolds (not shown in FIGS. 1A-1B). In an embodiment, the cold medium can have fluid properties (e.g., velocity, density, temperature, compressibility, and/or viscosity) different from the hot medium. Accordingly, in these embodiments, cold inlet manifolds and/or cold outlet manifolds can include vertical members having designs that are different from vertical members in hot inlet manifolds and/or hot outlet manifolds.

Discussion of Possible Embodiments

The following are non-exclusive descriptions of possible embodiments of the present invention.

A flexible manifold adapted for use on a plate-fin heat exchanger core, the flexible manifold comprising a plurality of individual layers, each individual layer defining a lower floor, an upper floor, and two side walls, wherein: each of the plurality of individual layers is adapted to channel a flow of a medium therethrough; each of the plurality of individual layers includes a plurality of vertical members; each of the plurality of vertical members extends vertically from the lower floor to the upper floor of the respective individual layer; and each of the plurality of vertical members is configured to provide structural support for the respective individual layer.

The flexible manifold of the preceding paragraph can optionally include, additionally and/or alternatively, any one or more of the following features, configurations and/or additional components:

A further embodiment of the foregoing flexible manifold, comprising a first end with at least one port adapted to receive or discharge the medium; and a second end distal from the first end, adapted to transfer the medium to or from the plurality of individual layers; wherein: two adjacent horizontal guide vanes define the respective individual layer there between; the plurality of individual layers are configured to be metallurgically joined to respective ones of a plurality of layers of the plate-fin heat exchanger core; and the flexible manifold is configured to be mechanically and thermally compliant.

A further embodiment of the foregoing flexible manifold, wherein each of the plurality of vertical members is configured to direct a flow of the medium through the respective individual layer.

A further embodiment of the foregoing flexible manifold, wherein the plate-fin heat exchanger core comprises a plurality of core layers, each core layer including: two parting sheets, each defining a parting sheet thickness; and two closure bars, each defining a closure bar thickness.

A further embodiment of the foregoing flexible manifold, wherein: each side wall has a first end side wall thickness and a first end floor thickness adjacent a first end of the flexible manifold; the first end side wall thickness is equal to the closure bar thickness; and the first end floor thickness is equal to the parting sheet thickness.

A further embodiment of the foregoing flexible manifold, wherein the plurality of individual layers comprise one or more of nickel, aluminum, titanium, copper, iron, cobalt, and alloys thereof.

A further embodiment of the foregoing flexible manifold, wherein the plurality of individual layers comprise Inconel 625, Inconel 718, Haynes 282, or AlSi10Mg.

A further embodiment of the foregoing flexible manifold, wherein the vertical members comprise vertical guide vanes dividing each of the plurality of individual layers into a plurality of discrete manifold flow passages extending at least part of a distance from a first end to a second end of the flexible manifold.

A further embodiment of the foregoing flexible manifold, wherein the vertical guide vanes further define at least one end radius configured to reduce material stress in a region of the individual layer.

A further embodiment of the foregoing flexible manifold, wherein the vertical guide vanes further define at least one end radius configured to reduce flow turbulence in the medium.

A further embodiment of the foregoing flexible manifold, wherein the vertical members comprise vertical columns.

A further embodiment of the foregoing flexible manifold, wherein the vertical columns have a hydrofoil cross section configured to control the flow of the medium through each of the plurality of individual layers.

A further embodiment of the foregoing flexible manifold, comprising a plate-fin heat exchanger.

A method of additively manufacturing a flexible manifold for a heat exchanger, comprising the steps of: additively building a housing for the first flexible manifold; within the housing, additively building a plurality of horizontal guide vanes defining a plurality of individual layers for a medium; and additively building a plurality of vertical members within each of the plurality of individual layers; wherein: each of the plurality of individual layers is adapted to channel a flow of the medium therethrough; each of the plurality of vertical members extends vertically from a lower floor to an upper floor of the respective individual layer; and each of the plurality of vertical members is configured to provide structural support for the respective individual layer.

The method of the preceding paragraph can optionally include, additionally and/or alternatively, any one or more of the following features, configurations and/or additional components:

A further embodiment of the foregoing method, wherein the steps of additively building comprise performing laser powder bed fusion.

A further embodiment of the foregoing method, wherein the vertical members comprise vertical guide vanes dividing each of the plurality of individual layers into a plurality of discrete manifold flow passages extending at least part of a distance from a first end to a second end of the flexible manifold.

A further embodiment of the foregoing method, wherein the vertical guide vanes further define at least one end radius configured to reduce material stress in a region of the respective individual layer.

A further embodiment of the foregoing method, wherein the vertical members comprise vertical columns configured to provide structural support for each of the plurality of individual layers.

A further embodiment of the foregoing method, wherein the vertical columns have a hydrofoil cross section configured to stabilize flow of the medium through each of the plurality of individual layers.

A further embodiment of the foregoing method, further comprising the steps of: forming a heat exchanger core, comprising a plurality of individual core layers; and metallurgically joining each of the individual layers to respective ones of the plurality the individual core layers, thereby metallurgically joining the first flexible manifold to the heat exchanger core; wherein the metallurgical joining comprises brazing or welding; thereby making plate-fin heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flexible manifold adapted for use on a plate-fin heat exchanger core, the flexible manifold comprising:

a plurality of individual layers, each individual layer defining a lower floor, an upper floor, and two side walls;
a first end with at least one port adapted to receive or discharge the medium; and
a second end distal from the first end, adapted to transfer the medium to or from the plurality of individual layers;
wherein:
two adjacent horizontal guide vanes define the respective individual layer there between;
each of the plurality of individual layers is adapted to channel a flow of a medium therethrough;
the plurality of individual layers are configured to be metallurgically joined to respective ones of a plurality of layers of the plate-fin heat exchanger core;
each of the plurality of individual layers includes a plurality of vertical members;
each of the plurality of vertical members extends vertically from the lower floor to the upper floor of the respective individual layer;
each of the plurality of vertical members is configured to provide structural support for the respective individual layer; and
the flexible manifold is configured to be mechanically and thermally compliant.

2. The flexible manifold of claim 1, wherein each of the plurality of vertical members is configured to direct a flow of the medium through the respective individual layer.

3. The flexible manifold of claim 1, wherein the plate-fin heat exchanger core comprises a plurality of core layers, each core layer including:
two parting sheets, each defining a parting sheet thickness; and
two closure bars, each defining a closure bar thickness.

4. The flexible manifold of claim 3, wherein:
each side wall has a first end side wall thickness and a first end floor thickness adjacent a first end of the flexible manifold;
the first end side wall thickness is equal to the closure bar thickness; and
the first end floor thickness is equal to the parting sheet thickness.

5. The flexible manifold of claim 1, wherein the plurality of individual layers comprise one or more of nickel, aluminum, titanium, copper, iron, cobalt, and alloys thereof.

6. The flexible manifold of claim 1, wherein the plurality of individual layers comprise Inconel 625, Inconel 718, Haynes 282, or AlSi10Mg.

7. The flexible manifold of claim 1, wherein the vertical members comprise vertical guide vanes dividing each of the plurality of individual layers into a plurality of discrete manifold flow passages extending at least part of a distance from a first end to a second end of the flexible manifold.

8. The flexible manifold of claim 1, wherein the vertical guide vanes further define at least one end radius configured to reduce material stress in a region of the individual layer.

9. The flexible manifold of claim 1, wherein the vertical guide vanes further define at least one end radius configured to reduce flow turbulence in the medium.

10. The flexible manifold of claim 1, wherein the vertical members comprise vertical columns.

11. The flexible manifold of claim 10, wherein the vertical columns have a hydrofoil cross section configured to control the flow of the medium through each of the plurality of individual layers.

12. A plate-fin heat exchanger, comprising at least one of the flexible manifolds of claim 1.

13. A method of additively manufacturing a flexible manifold for a heat exchanger, comprising the steps of:
additively building a housing for the first flexible manifold;
within the housing, additively building a plurality of horizontal guide vanes defining a plurality of individual layers for a medium; and
additively building a plurality of vertical members within each of the plurality of individual layers;
wherein:
each of the plurality of individual layers is adapted to channel a flow of the medium therethrough;
each of the plurality of vertical members extends vertically from a lower floor to an upper floor of the respective individual layer;
each of the plurality of vertical members is configured to provide structural support for the respective individual layer; and
the vertical members comprise vertical guide vanes dividing each of the plurality of individual layers into a plurality of discrete manifold flow passages extending at least part of a distance from a first end to a second end of the flexible manifold.

14. The method of claim 13, wherein the steps of additively building comprise performing laser powder bed fusion.

15. The method of claim 13, wherein the vertical guide vanes further define at least one end radius configured to reduce material stress in a region of the respective individual layer.

16. The method of claim 13, wherein the vertical members comprise vertical columns configured to provide structural support for each of the plurality of individual layers.

17. The method of claim 16, wherein the vertical columns have a hydrofoil cross section configured to stabilize flow of the medium through each of the plurality of individual layers.

18. A method of making a plate-fin heat exchanger comprising the method of claim 13, and further comprising the steps of:
forming a heat exchanger core, comprising a plurality of individual core layers; and
metallurgically joining each of the individual layers to respective ones of the plurality the individual core layers, thereby metallurgically joining the first flexible manifold to the heat exchanger core;
wherein the metallurgical joining comprises brazing or welding.

* * * * *